United States Patent
Kriz et al.

Patent Number: 5,818,880
Date of Patent: *Oct. 6, 1998

[54] MMIC TELEMETRY TRANSMITTER

[75] Inventors: Jeffrey J. Kriz, Robbinsdale; Dennis D. Ferguson, St. Paul, both of Minn.

[73] Assignee: Honeywell Inc., Minneapolis, Minn.

[ * ] Notice: The terminal 34 months of this patent has been disclaimed

[21] Appl. No.: 502,480

[22] Filed: Mar. 30, 1990

[51] Int. Cl.$^6$ .................................................. H03F 3/217

[52] U.S. Cl. ........................ 375/306; 330/251; 330/305; 330/307; 332/100; 455/111; 455/124

[58] Field of Search ................. 375/59, 62, 65, 375/67, 295, 297, 302, 303, 306; 455/95, 110, 111, 114, 124, 128, 129; 332/102, 105, 129, 130, 100, 103; 331/107 R, 107 DP, 107 SL, 116 R; 330/286, 306, 307, 251, 207 A, 302, 305, 192

[56] References Cited

U.S. PATENT DOCUMENTS

| | | | |
|---|---|---|---|
| 1,920,296 | 8/1933 | Coleman | 375/62 |
| 3,569,836 | 3/1971 | Deen | 455/114 |
| 3,668,553 | 6/1972 | Dunn et al. | 331/107 SL |
| 4,090,135 | 5/1978 | Farstad et al. | 375/62 |
| 4,394,628 | 7/1983 | Banks | 332/129 |
| 4,453,269 | 6/1984 | Skar | 455/124 |
| 4,481,642 | 11/1984 | Hauson | 375/62 |
| 4,717,884 | 1/1988 | Mitzlaff | 330/251 |
| 4,728,909 | 3/1988 | Rudelle | 332/130 |
| 4,771,247 | 9/1988 | Jacomb-Hood | 330/277 |
| 4,772,856 | 9/1988 | Nojima et al. | 330/251 |
| 4,775,845 | 10/1988 | McCoy | 331/107 SL |
| 5,276,912 | 1/1994 | Siwiak et al. | 455/73 |

FOREIGN PATENT DOCUMENTS

| | | |
|---|---|---|
| A0021943 | 1/1981 | European Pat. Off. . |
| A0202652 | 11/1986 | European Pat. Off. . |
| A0203663 | 12/1986 | European Pat. Off. . |
| A0205771 | 12/1986 | European Pat. Off. . |

*Primary Examiner*—Benedict V. Safourek
*Attorney, Agent, or Firm*—John G. Shudy, Jr.

[57] ABSTRACT

A telemetry transmitter having a dielectric resonator for frequency stabilization, a frequency or phase shift keying modulator and a high efficiency power amplifier. The transmitter can be implemented on gallium arsenide or other kinds of substrates The transmitter is of monolithic microwave integrated circuit (MMIC) technology. The transmitter may obtain its power from a power supply of a local or an associated system, thus not needing an integral power supply of its own.

18 Claims, 9 Drawing Sheets

MMIC TELEMETRY TRANSMITTER

FIELD OF THE INVENTION

The present invention pertains to monolithic microwave integrated circuitry. The invention particularly pertains to telemetry transmitters and more particularly to power-efficient, frequency-modulated transmitters.

BACKGROUND OF THE INVENTION

Telemetry transmitters have been known in the art. However, such transmitters to date have not been efficient, low-power, monolithic, and compact with excellent transmission range having compatibility with Inter Range Instrumentation Group (IRIG) telemetry standards.

SUMMARY OF THE INVENTION

The present invention is a monolithic telemetry transmitter chip set. The chip set includes several monolithic integrated circuits. The whole transmitter system may be incorporated on one monolithic chip, but such fabrication is not as cost effective as the utilization of several chips because of the lower yield rate in producing the single chip. The invention has an oscillating section that provides a high frequency fundamental signal output. There is a frequency stabilization element of the oscillating section which may be a ceramic resonator or some other highly efficient resonator set on an insulating substrate. The oscillating section or resonator output is modulated by a frequency-shift-keying monolithic circuit. The modulated signal is amplified by a class F power amplifying monolithic circuit. The monolithic circuits may be fabricated on substrates composed of gallium arsenide, silicon or the like.

The present invention provides power efficient, low cost, compact and long range transmission in subminiature packaging, utilizing monolithic microwave integrated circuit (MMIC) technology and having compatibility with Inter Range Instrumentation Group (IRIG) telemetry standards.

DESCRIPTION OF THE PREFERRED EMBODIMENT

Figure 1:
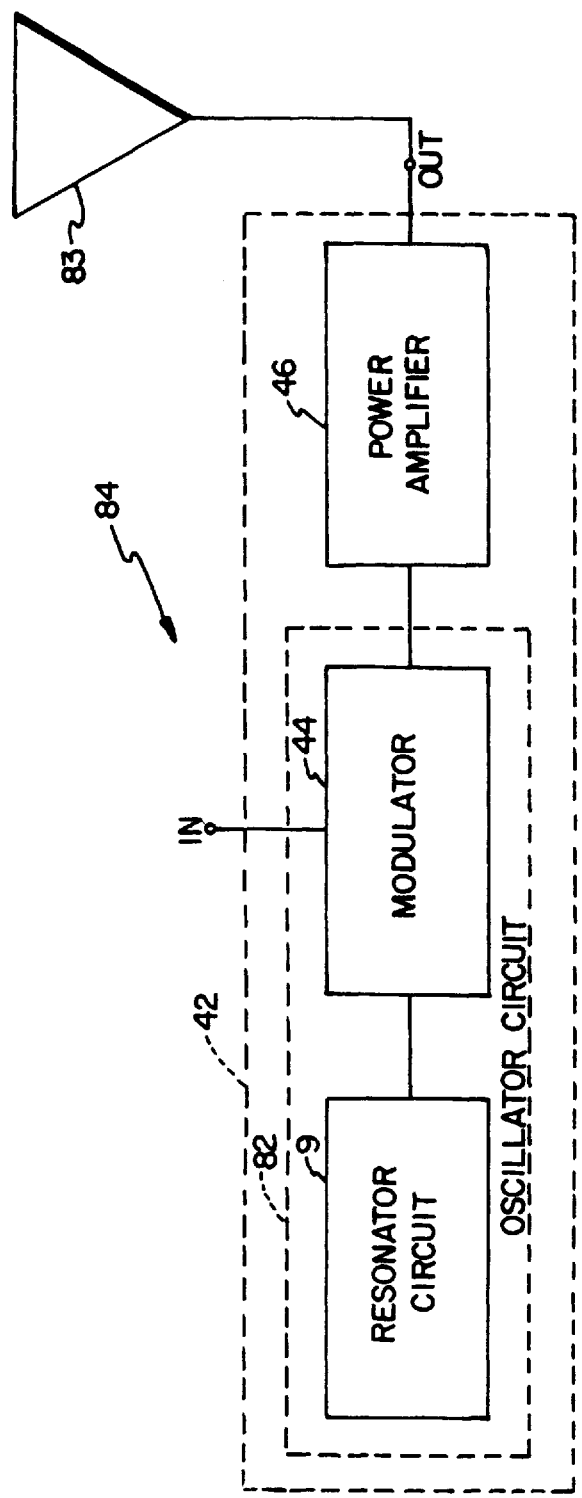
FIG. 1 is a block diagram of the present invention.
Figure 2A:
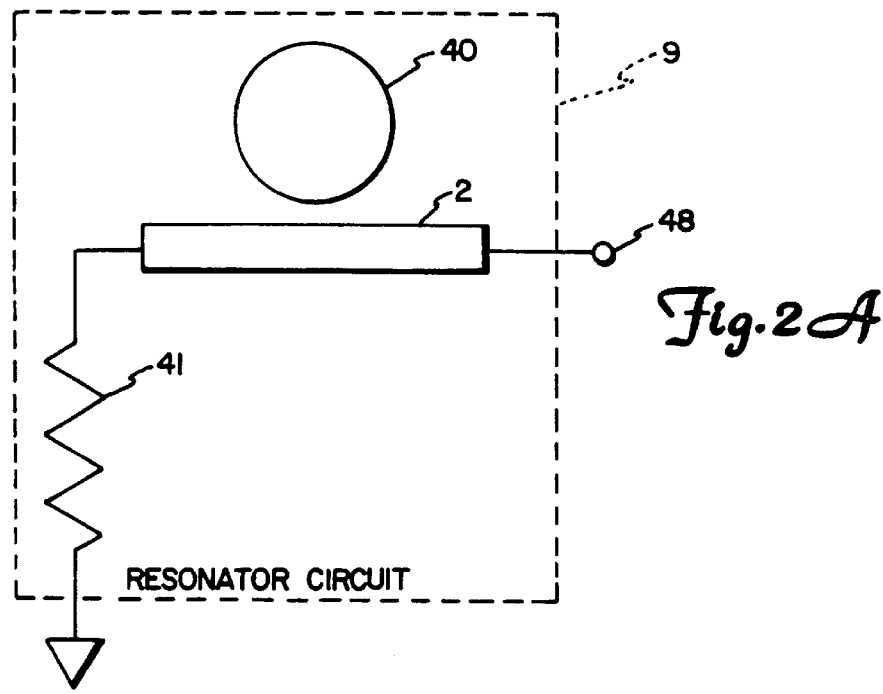
FIGS. 2a and 2b reveal the schematic and layout of the resonator circuit.
Figure 2B:
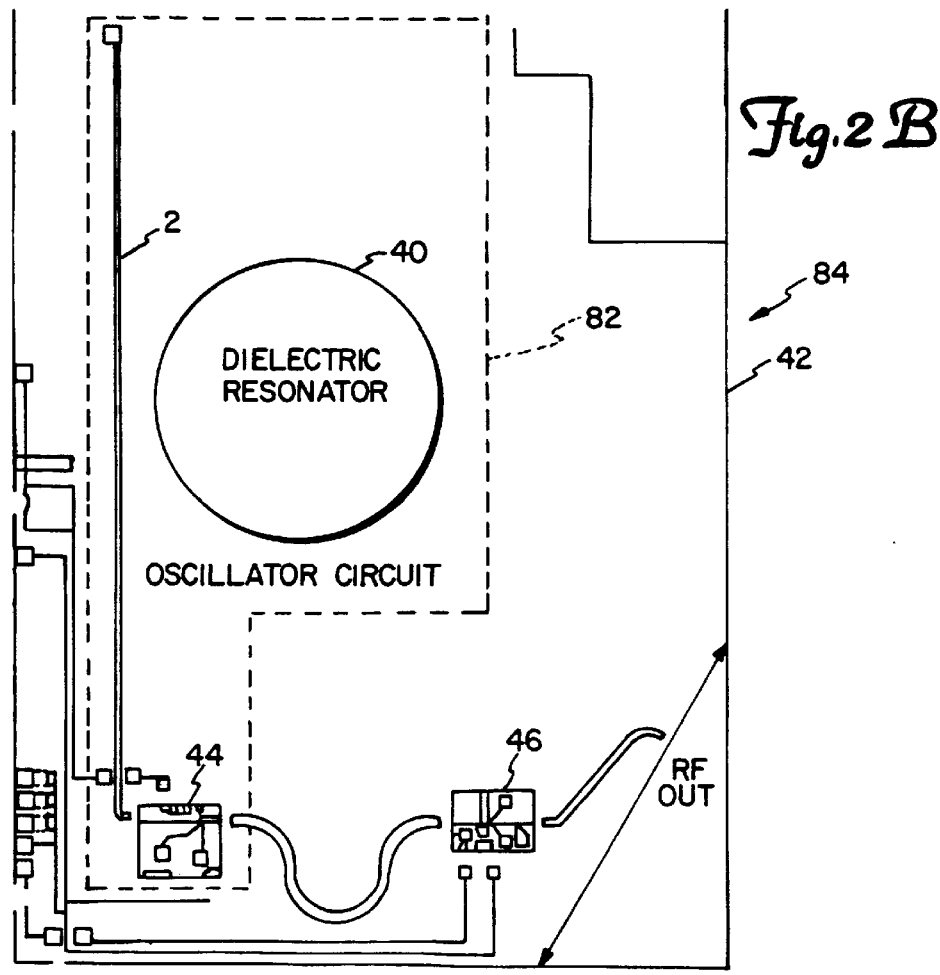
Figure 3A:
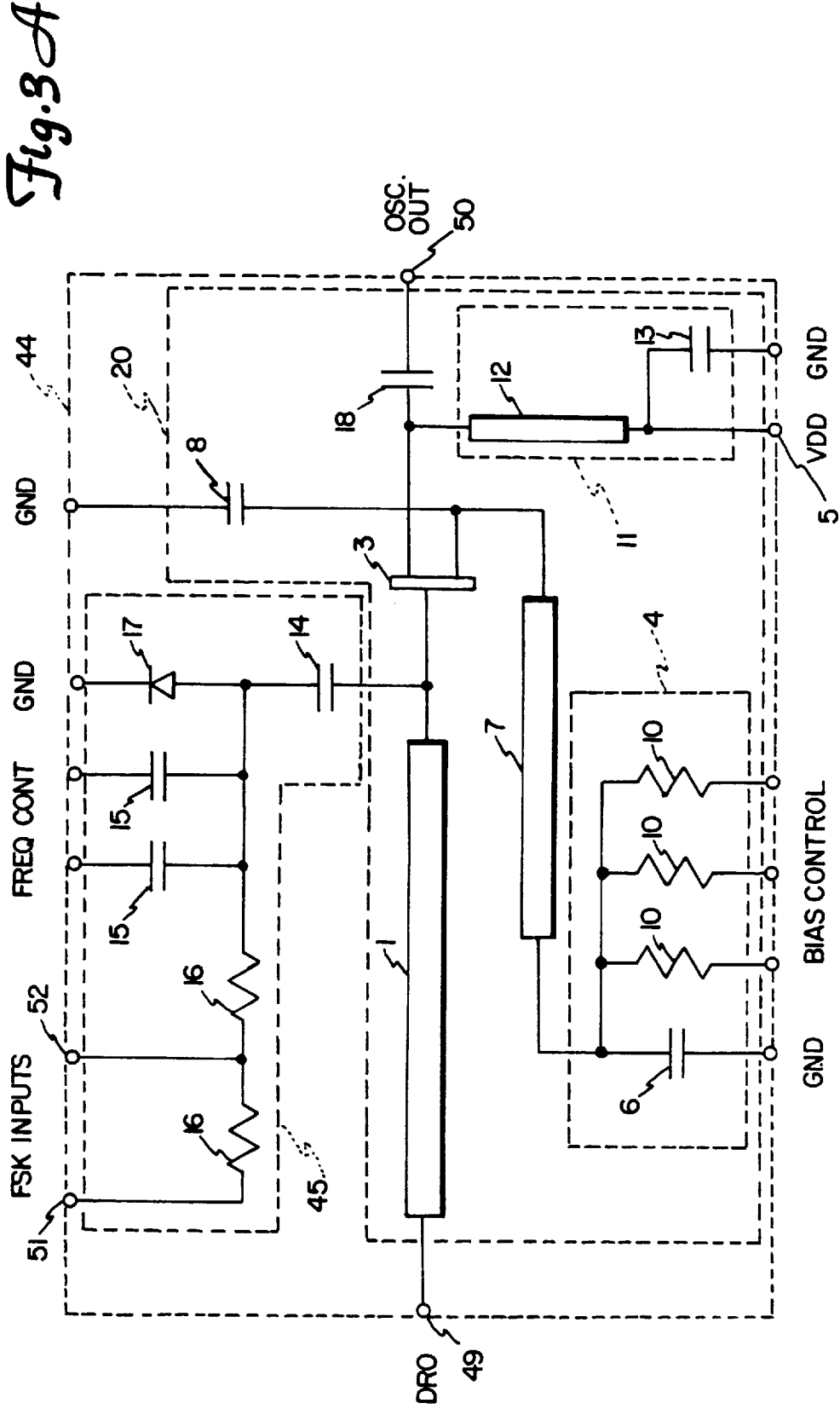
FIGS. 3a and 3b show the circuitry and layout for the modulator.
Figure 3B:
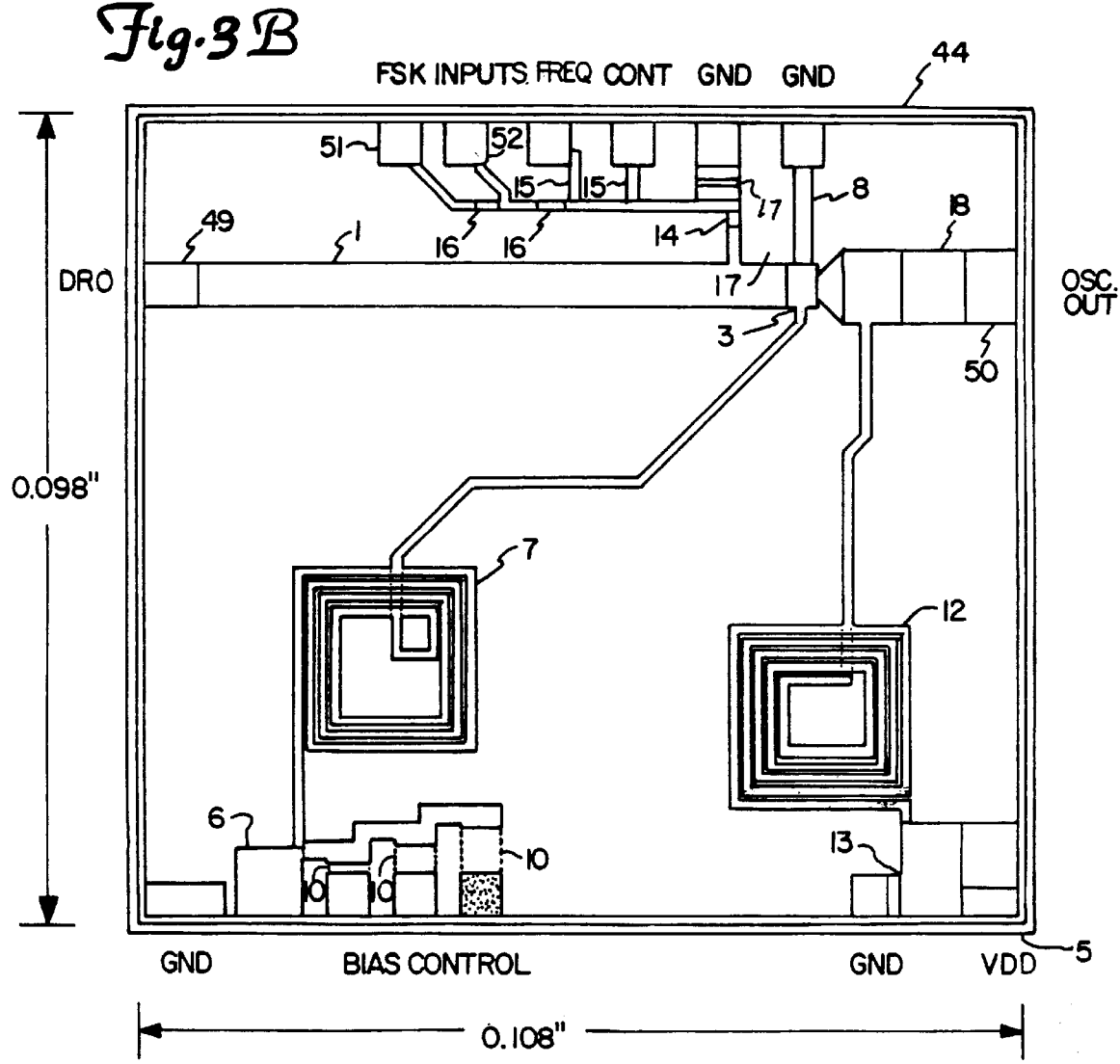
Figure 4A:
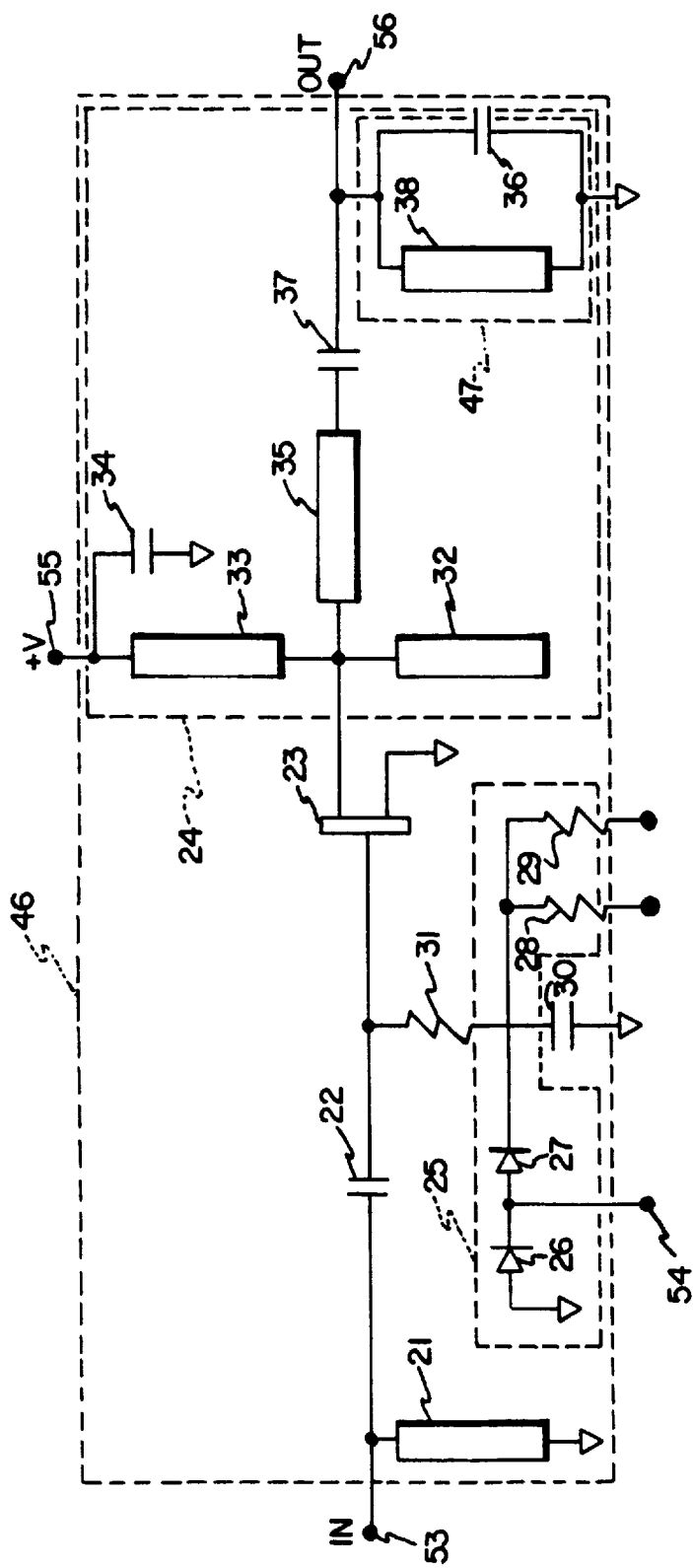
FIGS. 4a and 4b show the circuitry and layout for the one-stage amplifier.
Figure 4B:
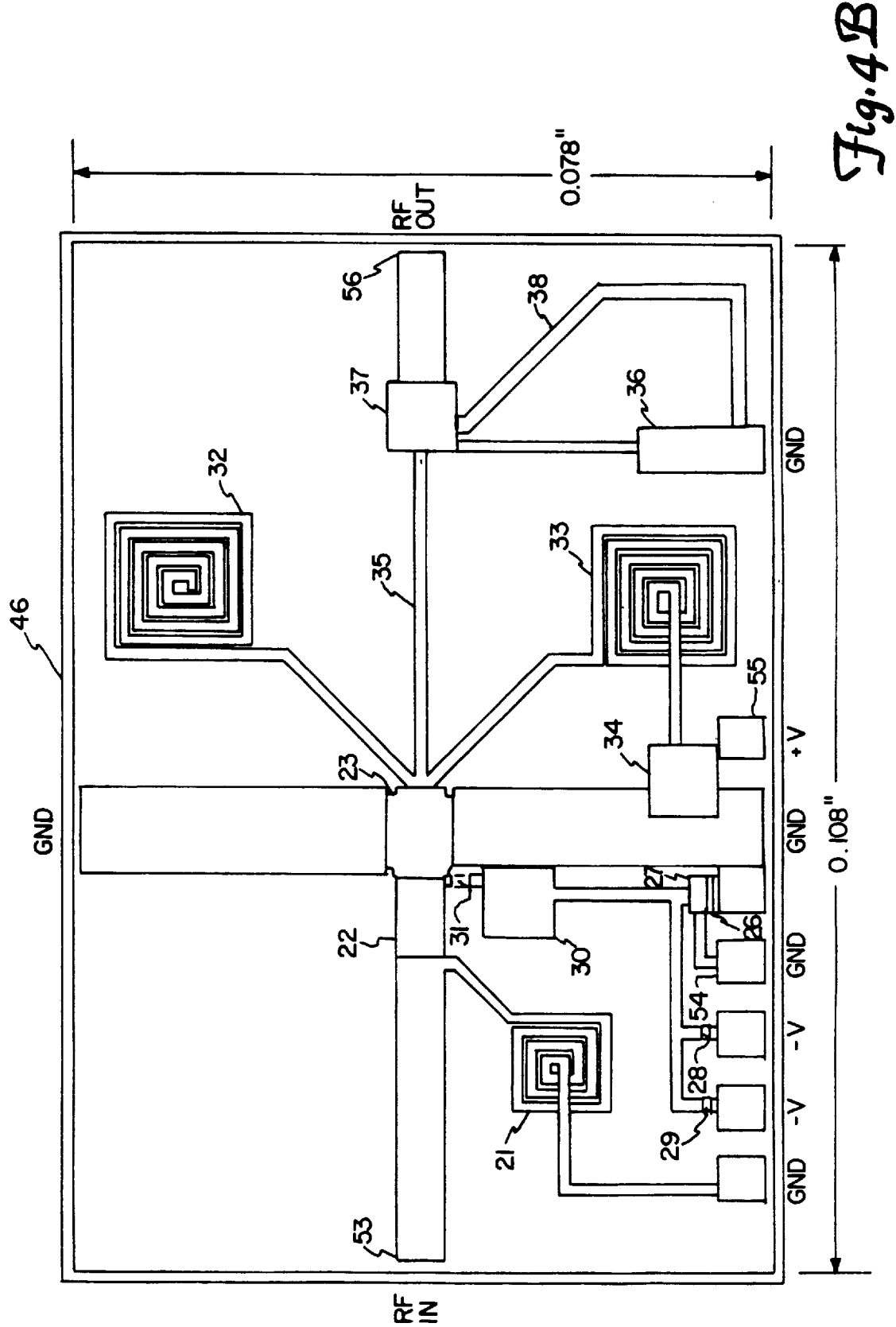

FIG. 1 shows the basic layout of the present invention. Telemetry transmitter 84 incorporates resonator circuit 9, modulator 44 and amplifier 46. Resonator circuit 9 and modulator 44 are oscillator circuit 82. Oscillator circuit 82 and amplifier 46 are on substrate 42. The output of transmitter is connected to antenna 83. FIG. 2a is a diagram of frequency stabilization element 40 of an embodiment of the present invention. FIG. 2b shows the layout of the frequency stabilization element 40 relative to the other elements of the invention. Frequency stabilization element 40 is a cylinder shaped piece of ceramic having a resonant frequency and being equivalent to an inductive-capacitive (LC) tank circuit or a quartz crystal having a high efficiency (Q). Frequency stabilization element 40 may be referred to as a ceramic or dielectric resonator (DR). Dielectric resonators of 2.2 GHz through 2.29 GHz, which is used in the present embodiment, may be available as part number D86-23-0630-Y-284-A from Trans-Tech, Inc., in Adamstown, Md., and as part number DRD248MC110A of Murata Mfg. Co., Ltd., in Kyoto, Japan. Resonators of other frequencies may be ordered and used in other embodiments of the present invention. Frequency stabilization element 40 is in close proximity to transmission line 2 and this proximity results in an electromagnetic coupling between transmission line 2 and frequency stabilization element 40. Frequency stabilization element 40 may be placed on substrate 42 of transmission line 2. One end of transmission line 2 is terminated with 50 ohm resistor 41 to ground. Resonator circuit 9 is enclosed in a metal cavity which has an adjustable lid height or screw that affects tuning of the circuit or determination of resonance. The unterminated end of transmission line 2 is output 48 of resonator circuit 9. Output 48 is connected to input 49 of chip 44 having a gallium arsenide (GaAs) substrate with a 0.007 inch thickness, which contains an oscillating circuit as shown in FIG. 3a. Input 49 is connected to 50 ohm transmission line 1. Transmission line 1 has a width of 0.005 inch and a length if 0.070 inch. Transmission line 1 is connected to transistor 3 which may be a metallic semiconductor field effect transistor (MESFET). The distance between resonator circuit 9 and transistor 3 is critical so as to result in a reflection of the energy that is in phase with the input energy at the oscillation frequency. The circuitry of chip 44 causes transistor 3 to be unstable at the frequency stabilization element 40 frequency ($f_o$). The oscillation frequency ($f_o$) may be adjusted between 2.20 through 2.29 gigahertz (GHz) which is the S-band telemetry range as indicated by IRIG. However, other embodiments of the present invention may utilize other ranges of oscillation frequencies. Bias control network 4 provides selectable current levels for transistor 3. Network 4 makes possible the use of a single supply voltage ($V_{DD}$) for chip 44 at terminal 5. Resistors 10 are discriminatively selected for providing a proper FET 3 gate-to-source voltage and a FET 3 drain current to be 50 percent of FET 3's maximum value which is $I_{DSS}$. Resistors 10 are typically 10, 20 and 30 ohms, respectively. Capacitor 6 bypasses resistors 10, in conjunction with transmission line 7 and capacitor 8, by conducting signals across a broad frequency range including the resonant frequency of resonator circuit 9. Also, capacitors 6 and 8 and transmission line 7 present a reactive termination at the source of transistor 3 to enhance the instability of transistor 3 so that it oscillates. Capacitor 6 is 14 picofarads (pF) and capacitor 8 is 4 pF. Transmission line 7 has a 0.001 inch width and a 0.325 inch length.

Inductive bias network 11 provides transistor 3 a 50 ohm output impedance. Also, network 11 allows biasing transistor 3 to the single voltage supply $V_{DD}$ at terminal 5. Transmission line 12 is a high impedance transmission line relative to the 50 ohm impedance output at terminal 50. Transmission line 12 has a 0.001 inch width and a 0.297 inch length. Bypass capacitor 13 has a value of 18 pF. Capacitor 18 blocks D.C. current leakage from output 50 of chip 44. Also, capacitor 18 couples the output signals of chip 44. Capacitor 18 is a 10 pF capacitor.

Frequency shift keying (FSK) circuit 45 is for modulating circuit 20. Modulating data signals enter one of two inputs 51 and 52 to chip 44 and go through one or two resistors 16 and capacitor 14, having a 1.0 pF value, to the gate of transistor 3. The signals are binary and cause a frequency deviation of the resonant frequency by alternatively turning diode 17 on or off to alter the reactance of oscillating circuit 20 in order to cause the frequency deviation. Capacitors 15, which have values of 0.5 and 1.0 pF, respectively,,along with resistors 16, each having a value of 100 ohms, provide the appropriate frequency deviation in accordance with the capacitive and resistive values. The operating frequency is deviated or altered in correct proportion to the data rate of the modulating signal. This results in binary FSK between two frequencies which is a variation from the center frequency of 2.25 GHz by a binary frequency of 2.251 MHz. Optimal frequency deviation is based on data rate in that bit stream frequency divided by frequency deviation is between 0.7 and 1.2. For instance, a 1 MHz deviation would be nearly optimal for a 1 megabit data stream. Optimal frequency deviation provides for optimal receiver detection. The smallest amount of deviation is sought but with a sufficient gap between the two frequencies for optimal detection and still being in conformance with telemetry standards of the Inter Range Instrumentation Group (IRIG), by having a power spectrum within 10 MHz.

Output 50 of chip 44 goes to input 53 of chip 46, on a GaAs substrate having a 0.007 inch thickness. Transmission line 21 is an input matching device for providing a 50 ohm impedance at input 53 of chip 46. Transmission line 21 is a shunt reactance to input 53. Transmission line 21 is 0.001 inch wide and 0.165 inch long. Capacitor 22 is connected in series with input 53 and transistor 23, and functions to block the negative D.C. voltage on the gate of transistor 23. Capacitor 22 has a value of about 6 pF. Capacitor 22 has no bearing on the circuit performance or resonance of chip 45 or chip 44. Input 53 of chip 46 is matched to output 50 of chip 44 to attain gain and optimal signal transfer.

Output network 24 of chip 46 is specially designed to provide harmonic terminations such as the shorting of second harmonics at the drain of transistor 23. Network 24 provides an open circuit at the drain of transistor 23 for third harmonic frequencies. Optimal output impedance at the fundamental frequency is presented for optimal power transfer out of chip 46 for maximum transmission of signals. Network 24 also provides for an output switching waveform having the voltage and current waveforms 180 degrees out of phase thereby resulting in little power dissipation in transistor 23 as most of the power is reactive. Actually, the amplifier of chip 46 may have a 25 to 75 efficiency depending on reactance, input power, type of transistor 23, and supply voltage(s). The present amplifier is a class A design having a 25 percent efficiency that is upgraded to a 50 to 75 percent efficiency by being converted to a class F design via the incorporation of appropriate harmonic terminations.

Bias network 25 provides an adjustable negative voltage supply to the gate of transistor 23. The adjustable supply allows for device 23 variations in pinch-off voltage. A negative supply voltage may be connected to one of two resistors 28 or 29, each having a value of 250 ohms, depending on the magnitude of the supply voltage. The bias voltage may be adjusted to be either −0.7 or −1.4 volts according to whether or not connection 54 between diodes 26 and 27 is connected to ground, respectively. If connection 54 is connected to ground, then the current flow is from ground through diode 27, which provides a −0.7 diode voltage drop with respect to ground, and through one or both resistors 28 and 29 to the negative voltage supply. If the interconnection of diodes is not to ground, then there is a −1.4 diode voltage drop through diodes 26 and 27. The −0.7 or −1.4 voltage is applied to the gate of transistor 23 via 100 ohm shunt resistor 31. The primary purpose of shunt resistor 31 and 10 pF capacitor 30 is to shift the phase response of the microwave frequency signals being applied to the gate. Capacitor 30 bypasses the negative bias voltage selection network 25 so that network 25 does not interfere with the input matching impedance network incorporating transmission line inductor 21 and shunt resistor 31 utilized for matching the impedance for optimal reception of incoming signals.

Transistor 23 functions as a switching transistor at a high incident power level utilizing output network 24 to achieve out-of-phase switching waveforms of voltage and current. The source of transistor 23 is connected to ground. The signal output of transistor 23 is on the drain. Transistor 23 may be a MESFET constructed from 1 micron gate length process technology with a 0.5 micron gate-to-source spacing. The gate is offset with significant spacing from the drain to improve the transistor breakdown voltage to 16 volts.

Transmission line 32, having a 0.001 inch width and a 0.119 inch length, is connected to the drain of transistor 23 and creates a short to second harmonic frequencies at the drain. Transmission line 33, also having a 0.001 inch width and a 0.119 inch length, is connected between the drain of device 23 and a positive voltage supply at terminal 55. Transmission line 33 cancels the effect of transmission line 32 at the fundamental frequency and provides a means for biasing transistor 23. Capacitor 34 is a bypass capacitor for isolating the amplifier circuit from parasitic reactances off chip 46. Capacitor 34 may have a value of 10 to 20 pF. Transmission line 35, having a 0.0005 inch width and a 0.024 inch length, takes the short created for the third harmonic by capacitor 36 and rotates the impedance (i.e., the third harmonic short) to create an open circuit at the quarter-wave length of the third harmonic at transistor 23. Transmission line 35 is a conduit for the output of transistor 23 and provides optimal impedance matching from transistor 23 to output 56 of chip 46. Output 56 may be connected to antenna 83. Capacitor 37, having a value of 10 pF, is connected between transmission line 35 and output 56. Capacitor 37 conducts the signal output and blocks the D.C. voltage present at the drain of transistor 23

Figure 5:
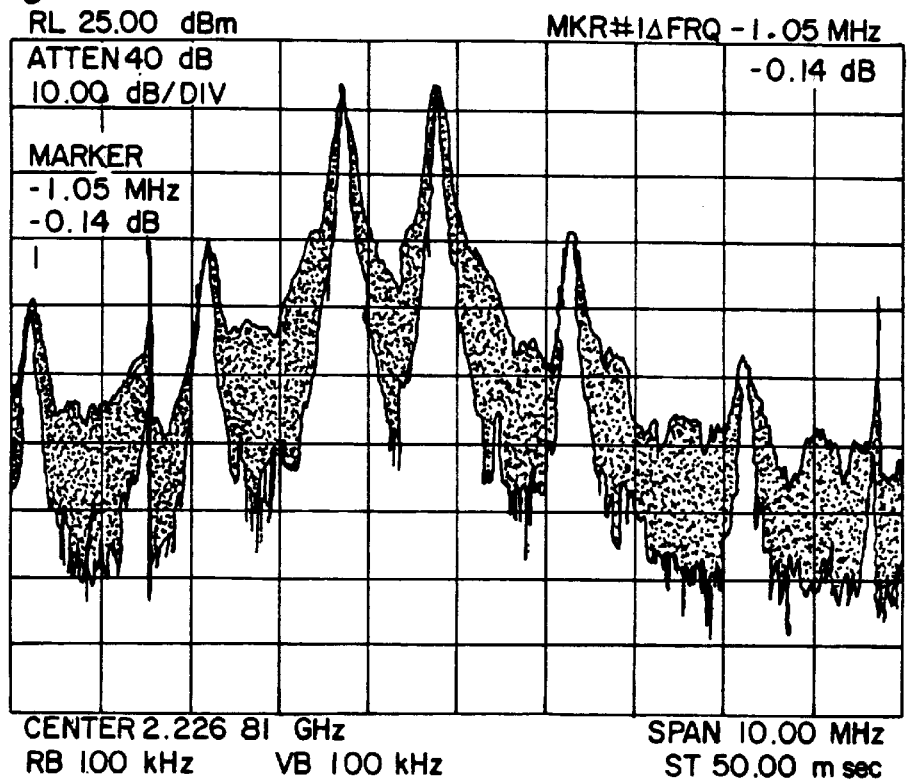
FIG. 5 is a graph revealing performance characteristics of the present invention.

Transmission line 38, having a 0.001 inch width and a 0.036 length, and capacitor 36, having a value of 1.6 pF, form tank circuit 47 which is tuned to the fundamental frequency and permits only the fundamental frequency including the frequency deviations of the signals to output chip 47. Tank circuit 47 is connected between the output of chip 46 and ground. Tank circuit 47 is a single resonator band-pass filter at the fundamental frequency ($f_o$) designed to filter out second, third, fourth, fifth and higher harmonic frequencies. Tank circuit 47 has the inherent purpose of creating the third harmonic short for transmission line 35. The filter aspect of circuit 47 is a consequential benefit. FIG. 5 reveals the performance of the present invention, in terms of the modulated output spectrum, having the configuration as shown in FIGS. 2, 3a, 3b, 4a and 4b. The free space broadcast capability of telemetry transmitter 84 is approximately 2 kilometers with an output power of about 23 decibel milliwatts (dBm) or about 200 milliwatts of continuous wave (CW) transmissions.

Figure 7:
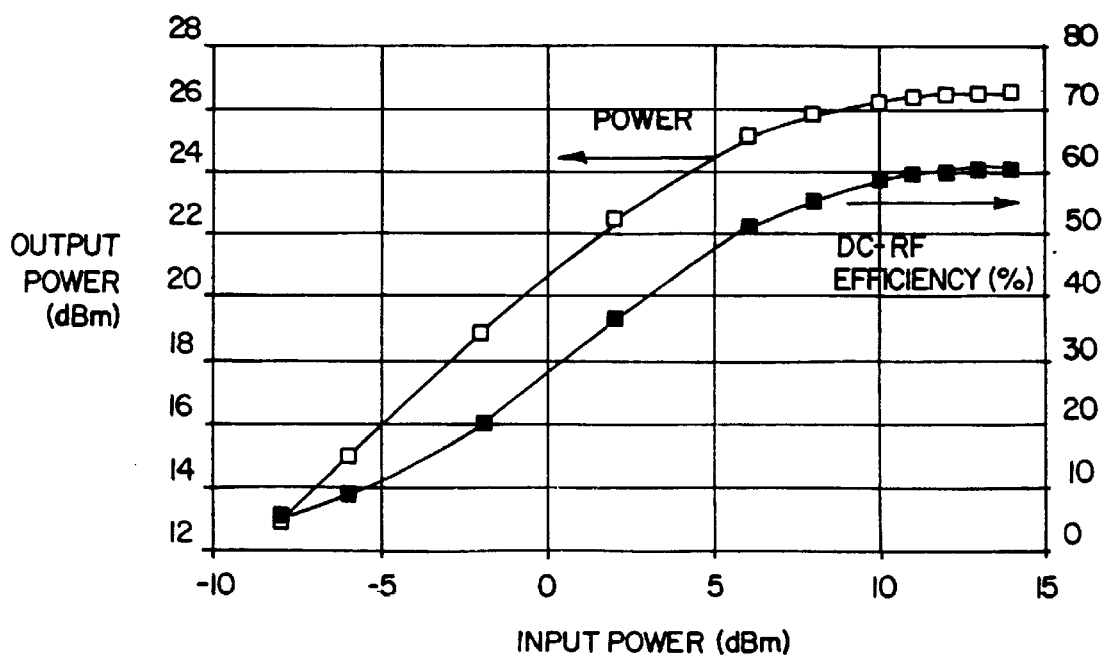
FIG. 7 is a graph revealing performance characteristics of the two-stage amplifier.
Figure 6A:
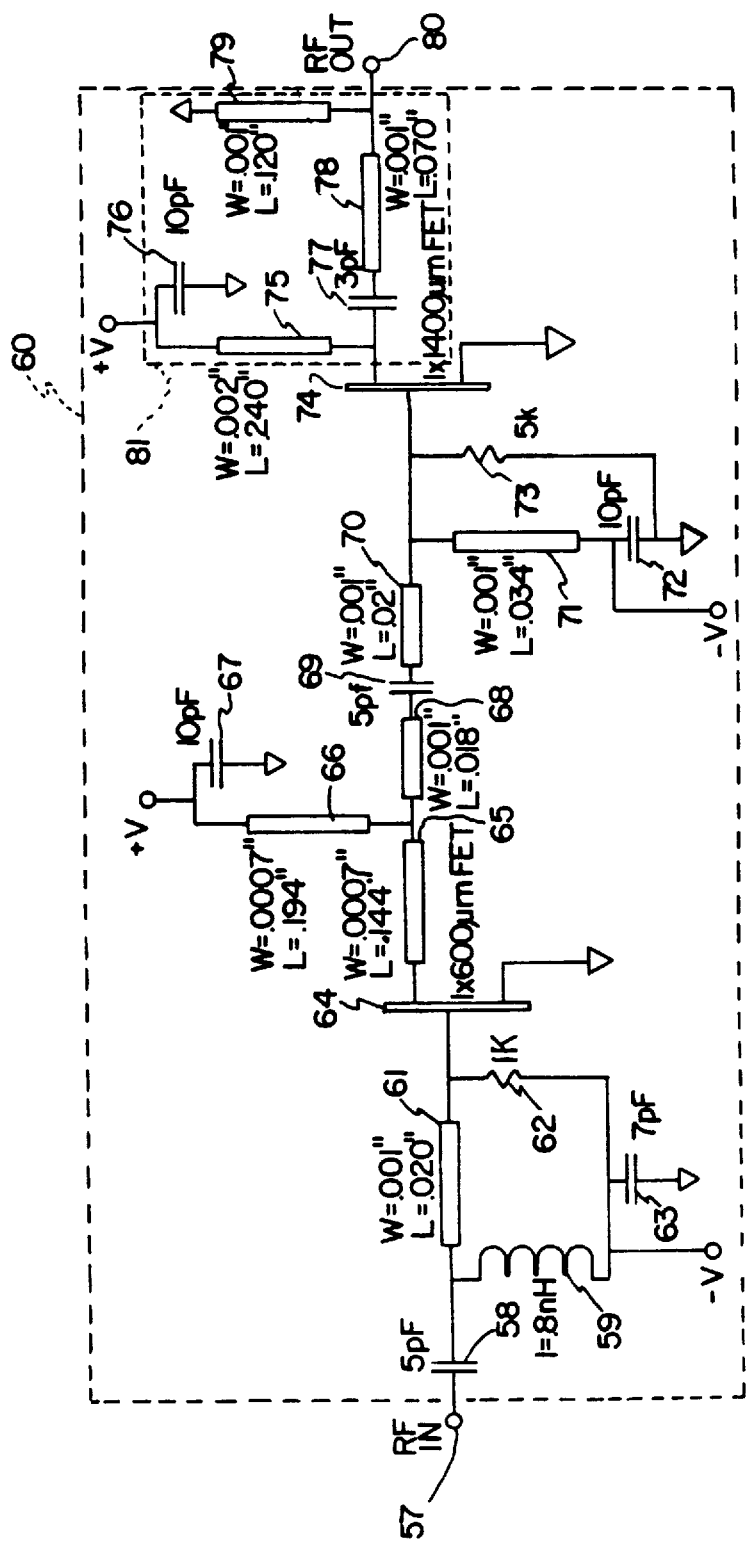
FIGS. 6a and 6b show the circuitry and layout for the two-stage amplifier.
Figure 6B:
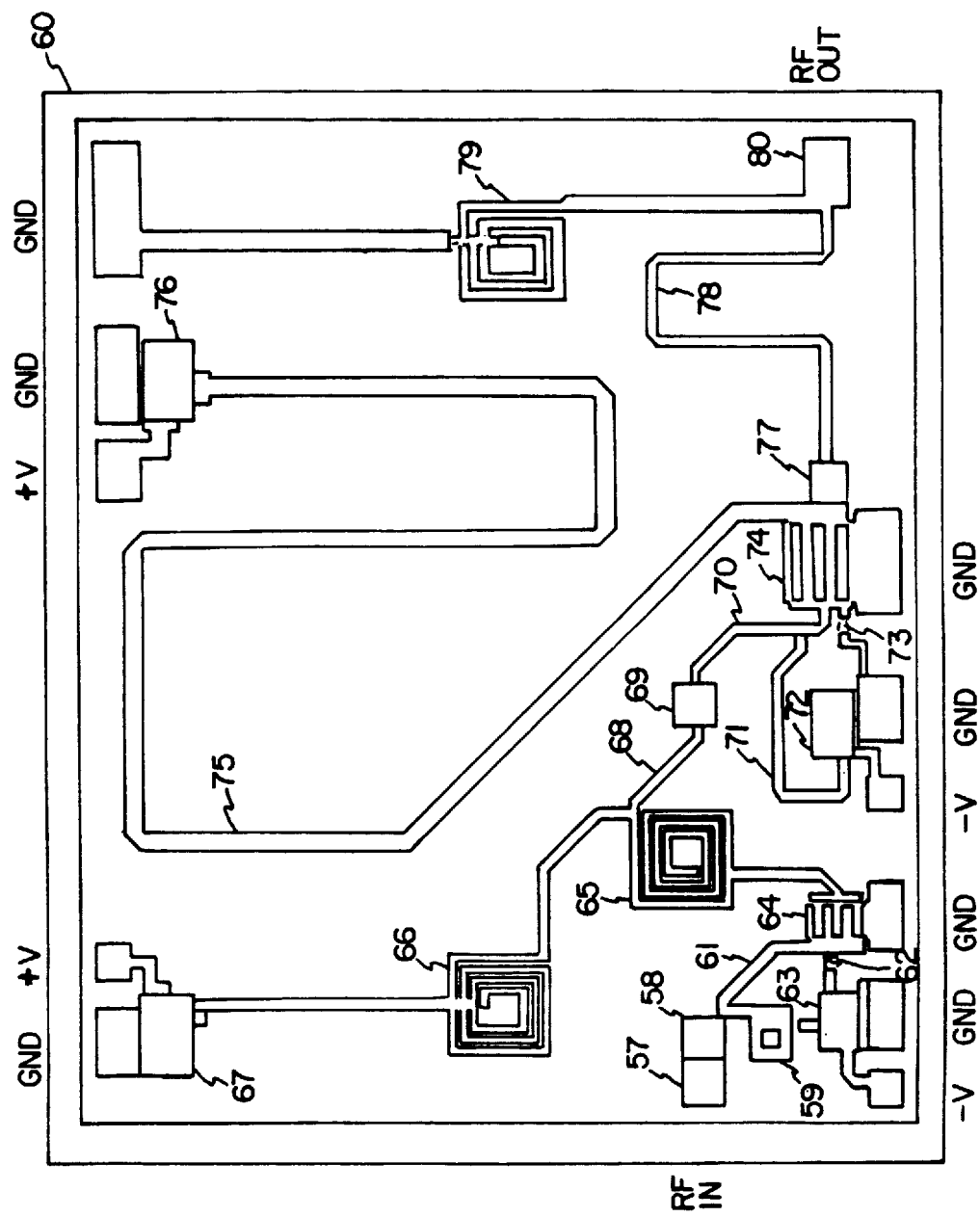

The present invention may incorporate a two-stage class F amplifier in lieu of the above described one-stage class F amplifier of chip 46. The amplifier on chip 60, having a gallium arsenide (GaAs) substrate with a 0.007 inch thickness, of FIGS. 6a and 6b is designed for 4.3 GHz. Chip 60 may be connected to the modulated output of chip 44 if chip 60 is modified to operate in conjunction with chip 44 at frequencies between 2.2 and 2.29 GHz. The amplifier of chip 60 was designed for altimeter applications operating at 4.3 GHz. However, the same design theory was utilized on this amplifier as the single-stage amplifier of chip 46 except that different matching networks were designed to provide the proper harmonic terminations at a higher frequency. FIG. 7 is a graph of the performance of the two-stage class F amplifier. FIG. 7 shows the relationship of output power and amplifier efficiency to input power. As FIG. 6a indicates, the oscillation signal enters input 57 which is connected to 5 pF DC blocking capacitor 58. Capacitor 58 is connected to a 0.8 nanohenry inductor and to transmission line 61. Inductor 59 is connected to a negative voltage supply, to 1000 ohm resistor 62, and to 7 pF capacitor 63. Capacitor 63 is connected to ground. Resistor 62 is connected to the base of transistor 64 and to transmission line 61. Transmission line 61 has a 0.001 inch width and a 0.020 inch length. Transistor 64 may be a MESFET. FET 64 has 1 by 600 micron dimensions. The source of FET 64 is connected to ground. The drain of FET 64 is connected to transmission line 65 having a 0.0007 inch width and a 0.144 inch length. Transmission line 65 is connected to transmission lines 66 and 68. Transmission line 66 has a 0.0007 inch width and a 0.194 inch length Transmission line 68 has a 0.001 inch width and a 0.018 inch length. Transmission line 66 is connected to a positive voltage supply and to 10 pF capacitor 67. Capacitor 67 is connected to ground. Transmission line 68 is connected to 5 pF capacitor 69 which in turn is connected to transmission line 70. Transmission line 70 has a 0.001 width and a 0.02 inch length. Transmission line 70 is connected to transmission line 71 and to 5000 ohm resistor 73. Transmission line 71 has a 0.001 inch width and a 0.034 inch length. Transmission line 71 is connected to 10 pF capacitor 72 and to the negative voltage supply. Capacitor 72 and resistor 73 are connected to ground. Transmission line is also connected to the base of transistor 74. transistor 74 may be a MESFET having 1 by 1400 micron dimensions. The source of FET 74 is connected to ground. The drain of FET 74 is connected to transmission line 75 and to 3 pF capacitor 77. Transmission line 75 has a 0.002 inch width and a 0.240 inch length. Transmission line 75 is connected to the positive voltage supply and to 10 pF capacitor 76 which in turn is connected to ground. Capacitor 77 is connected to transmission line 78 which in turn is connected to transmission line 79 and to chip 60 output 80. Transmission line 78 has a 0.001 inch width and a 0.070 inch length and transmission line 79 has a 0.001 inch width and a 0.120 inch length. Transmission line 79 is connected to ground. FIG. 6b reveals the layout for the two stage class F amplifier of chip 60. Output network 81 uses a different circuit architecture then output network 24, although network 81 provides the same harmonic terminations at the second and third harmonics as required by the theory of class F amplifier operation. Another kind of a high efficiency power amplifier such as a class A-B, B, C, D or E amplifier, may be utilized in lieu of the class F amplifier in the present invention.

Gallium arsenide (GaAs) MMIC fabrication of the present invention may be accomplished by Triquint Semiconductor of Beaverton, Oreg.

The present invention may utilize alternative means of frequency stabilization other than resonator circuit 9. A surface acoustic wave (SAW) resonator or a crystal resonator may be used in conjunction with a lower frequency oscillator to generate a stabilized reference frequency. This reference may then be used to phase lock the oscillating FET on chip 44. Modulation of this circuit is accompanied by either FSK circuit 45 or summing a binary data signal with the control voltage generated by the phase lock circuitry.

We claim:

1. A telemetry transmitter comprising a class F monolithic amplifier for amplifying signals, comprising:
   a transistor;
   an input impedance matching device, connected to a first terminal of the transistor, having a transmission line;
   an output network, connected to a second terminal of the transistor, having at least one transmission line, for eliminating harmonics of the signals, and connected to the output network; and
   an output tank circuit, connected to the output network, tuned to the signals, having a transmission line and a capacitive element.

2. The telemetry transmitter of claim 1, further comprising a monolithic modulator, having an output connected to the input impedance matching device, and having an input, said modulator comprising:
   a transmission line connected to the input;
   a transistor having a first terminal connected to the first transmission line and a second terminal connected to the input impedance matching device of said class F amplifier;
   a bias control network connected to a third terminal of the transistor; and
   a frequency shift keying circuit connected to the first terminal of the transistor, for causing a frequency deviation of the frequency of signals at the first and second terminals of the transistor.

3. The telemetry transmitter of claim 2, wherein said class F amplifier and said modulator are implemented in and compatible with monolithic microwave integrated circuit technology.

4. The telemetry transmitter of claim 3, wherein said class F amplifier and said modulator are of one monolithic integrated circuit.

5. The telemetry transmitter of claim 4 further comprising a resonator circuit connected to the input of said monolithic modulator.

6. The telemetry transmitter of claim 5, wherein said resonator circuit comprises a dielectric resonator.

7. The telemetry transmitter of claim 4, wherein the one monolithic integrated circuit has a gallium arsenide substrate.

8. The telemetry transmitter of claim 5, wherein said resonator circuit comprises a dielectric resonator.

9. A telemetry transmitter comprising a class F monolithic amplifier for amplifying signals, said class F monolithic amplifier comprising:
   a first transmission line connected to an input of said class F monolithic amplifier;
   a first transistor having a first terminal connected to the first transmission line;
   a second transmission line connected to a second terminal of the first transistor;
   a first at least one transmission line connected to the second transmission line;
   a second transistor having first terminal connected to the first at least one transmission line; and
   a second at least one transmission line connected to a second terminal of the second transistor and to an output of said class F monolithic amplifier.

10. The telemetry transmitter of claim 9, further comprising a monolithic modulator, having an output connected to the first transmission line, and having an input, said modulator comprising:

a transmission line connected to the input;

a transistor having a first terminal connected to the transmission line and a second terminal connected to the first transmission line of said class F monolithic amplifier;

a bias control network connected to a third terminal of the transistor; and a frequency shift keying circuit connected to the first terminal of the transistor, for causing a frequency deviation of a frequency of signals at the first and second terminals of the transistor.

11. The telemetry transmitter of claim 10, wherein said class F monolithic amplifier and said monolithic modulator are implemented in and compatible with monolithic microwave integrated circuit technology.

12. The telemetry transmitter of claim 11, wherein said class F monolithic amplifier and said monolithic modulator are of one monolithic integrated circuit.

13. The telemetry transmitter of claim 12, further comprising a resonator circuit connected to the input of said monolithic modulator.

14. The telemetry transmitter of claim 12, wherein the one monolithic integrated circuit has a gallium arsenide substrate.

15. A telemetry transmitter comprising;

an oscillator; and a class F power amplifier, connected to said oscillator, having at least one transmission line harmonic termination to minimize power dissipation of said amplifier; and wherein:

said oscillator and said class F power amplifier are implemented in and compatible with monolithic microwave integrated circuit (MMIC) technology; and said oscillator comprises:
a resonator; and
a frequency shift keying modulator connected to said resonator and to said class F power amplifier.

16. The telemetry transmitter of claim 15 wherein said telemetry transmitter operates in the S-band frequency range.

17. The telemetry transmitter of claim 16 wherein:

said class F power amplifier is fabricated on an gallium arsenide substrate; and said resonator comprises a dielectric resonator.

18. The telemetry transmitter of claim 17 wherein said class F power amplifier is a multi-stage amplifier.

* * * * *

UNITED STATES PATENT AND TRADEMARK OFFICE
CERTIFICATE OF CORRECTION

PATENT NO. : 5,818,880
DATED : October 6, 1998
INVENTOR(S) : Jeffrey J. Kriz, et al.

It is certified that error appears in the above-identified patent and that said Letters Patent is hereby corrected as shown below:

Column 1, line 2, insert:

--<u>U.S. Government Rights</u>

The U.S. Government has certain rights in the present invention pursuant to Contract No. DAAA21-86-C-0308, awarded by the Department of the Army.--

Signed and Sealed this

Twenty-third Day of February, 1999

*Attest:*

Q. TODD DICKINSON

*Attesting Officer*  Acting Commissioner of Patents and Trademarks